US011645326B2

(12) United States Patent
Boulanger et al.

(10) Patent No.: US 11,645,326 B2
(45) Date of Patent: May 9, 2023

(54) AUTOMATIC REFERENCE FINDING IN AUDIOVISUAL SCENES

(71) Applicant: HARMAN INTERNATIONAL INDUSTRIES, INCORPORATED, Stamford, CT (US)

(72) Inventors: Adam Boulanger, Palo Alto, CA (US); Sven Kratz, Mountain View, CA (US); Joseph Verbeke, San Francisco, CA (US); Stefan Marti, Oakland, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 248 days.

(21) Appl. No.: 16/254,523

(22) Filed: Jan. 22, 2019

(65) Prior Publication Data

US 2020/0233896 A1 Jul. 23, 2020

(51) Int. Cl.
*G06F 16/48* (2019.01)
*G06F 16/483* (2019.01)
*G06F 16/43* (2019.01)
*G06F 16/438* (2019.01)
*G06V 20/20* (2022.01)

(52) U.S. Cl.
CPC ............ *G06F 16/483* (2019.01); *G06F 16/43* (2019.01); *G06F 16/438* (2019.01); *G06F 16/489* (2019.01); *G06V 20/20* (2022.01); *G06V 2201/10* (2022.01)

(58) Field of Classification Search
CPC ....... G06F 16/483; G06F 16/43; G06F 16/489
See application file for complete search history.

(56) References Cited

U.S. PATENT DOCUMENTS

| 2007/0250901 | A1  | 10/2007 | Mcintire et al. |
| 2010/0103277 | A1  | 4/2010  | Leebow |
| 2011/0072012 | A1* | 3/2011  | Ah-Pine ............... G06F 16/54 707/723 |
| 2013/0173466 | A1* | 7/2013  | Lepisto ............... G06Q 20/384 705/44 |
| 2015/0078727 | A1  | 3/2015  | Ross et al. |
| 2017/0078767 | A1* | 3/2017  | Borel ................. G11B 27/031 |
| 2018/0096122 | A1  | 4/2018  | Turner et al. |

OTHER PUBLICATIONS

Extended European Search Report for application No. 20152549.0 dated Apr. 21, 2020.

* cited by examiner

*Primary Examiner* — Loc Tran
(74) *Attorney, Agent, or Firm* — Artegis Law Group, LLP

(57) ABSTRACT

Embodiments of the present disclosure set forth a computer-implemented method for identifying an object within an environment comprising receiving, via at least one sensor, first sensor data associated with an environment, storing, in a memory, the first sensor data in association with a first scene, and in response to receiving a user request for information associated with the environment, selecting, based on the user request, the first scene, accessing, via the memory, the first sensor data associated with the first scene, and, analyzing the first sensor data to identify a first object included in the first scene, and causing information associated with the first object to be output via at least one output device.

19 Claims, 5 Drawing Sheets

AUTOMATIC REFERENCE FINDING IN AUDIOVISUAL SCENES

BACKGROUND

Field of the Various Embodiments

Embodiments of the present disclosure relate generally to computer information systems and, more specifically, to automatic reference finding in audiovisual (A/V) scenes.

Description of the Related Art

The establishment of the Internet has made information on essentially any subject readily available to anyone with an Internet connection. Furthermore, the widespread use of smartphones, wearables, and other devices provides many users an Internet connection at essentially all times. Because of the near-ubiquitous access to knowledge sources via the Internet, users can easily search for information on a variety of subjects by initiating text-based keyword or key phrase searches. Furthermore, Internet-connected devices, such as intelligent personal assistants (IPAs), such as Microsoft Cortana™, Apple Siri™, and Amazon Alexa™ enable users to initiate a search for information on a particular topic without looking at a display screen, or manually enter search parameters as text. Instead, the user can retrieve information from the Internet verbally by speaking a question or other natural-language phrase to the IPA.

In general, in order to perform a search on a subject, the user initiating the search must provide at least some specific information about the subject. However, in many instances, the user may be unable to initiate the search because the user may not be able to sufficiently identify a subject, describe key information relating to a particular subject, and/or provide relevant search parameters for the subject to be searched. For example, when a person sees a fleeting object in an environment, the user may not be able to identify the object, or be able to describe the object accurately. When the user is not able to initiate an Internet search for an object with sufficient accuracy, the Internet-connected device is not able to provide search results that include applicable information on the object. As a result, the user may be unable to effectively employ the vast information pool of the Internet to determine, or otherwise examine, an object within a given scene.

In light of the above, more effective techniques for identifying aspects of an environment would be useful.

SUMMARY

Embodiments of the present disclosure set forth a computer-implemented method for identifying an object within an environment comprising receiving, via at least one sensor, first sensor data associated with an environment, storing, in a memory, the first sensor data in association with a first scene, and in response to receiving a user request for information associated with the environment, selecting, based on the user request, the first scene, accessing, via the memory, the first sensor data associated with the first scene, and, analyzing the first sensor data to identify a first object included in the first scene, and causing information associated with the first object to be output via at least one output device.

Further embodiments provide, among other things, a method and computer-readable storage medium for implementing aspects of the methods set forth above.

At least one technological advantage of the disclosed techniques is that an object within a given scene can be identified, even when the object is no longer present within the scene. A further advantage is that information for an identified object in a scene can be obtained from one or more data sources and provided to a user without requiring the user to provide detailed information related to the object.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

Figure 1:
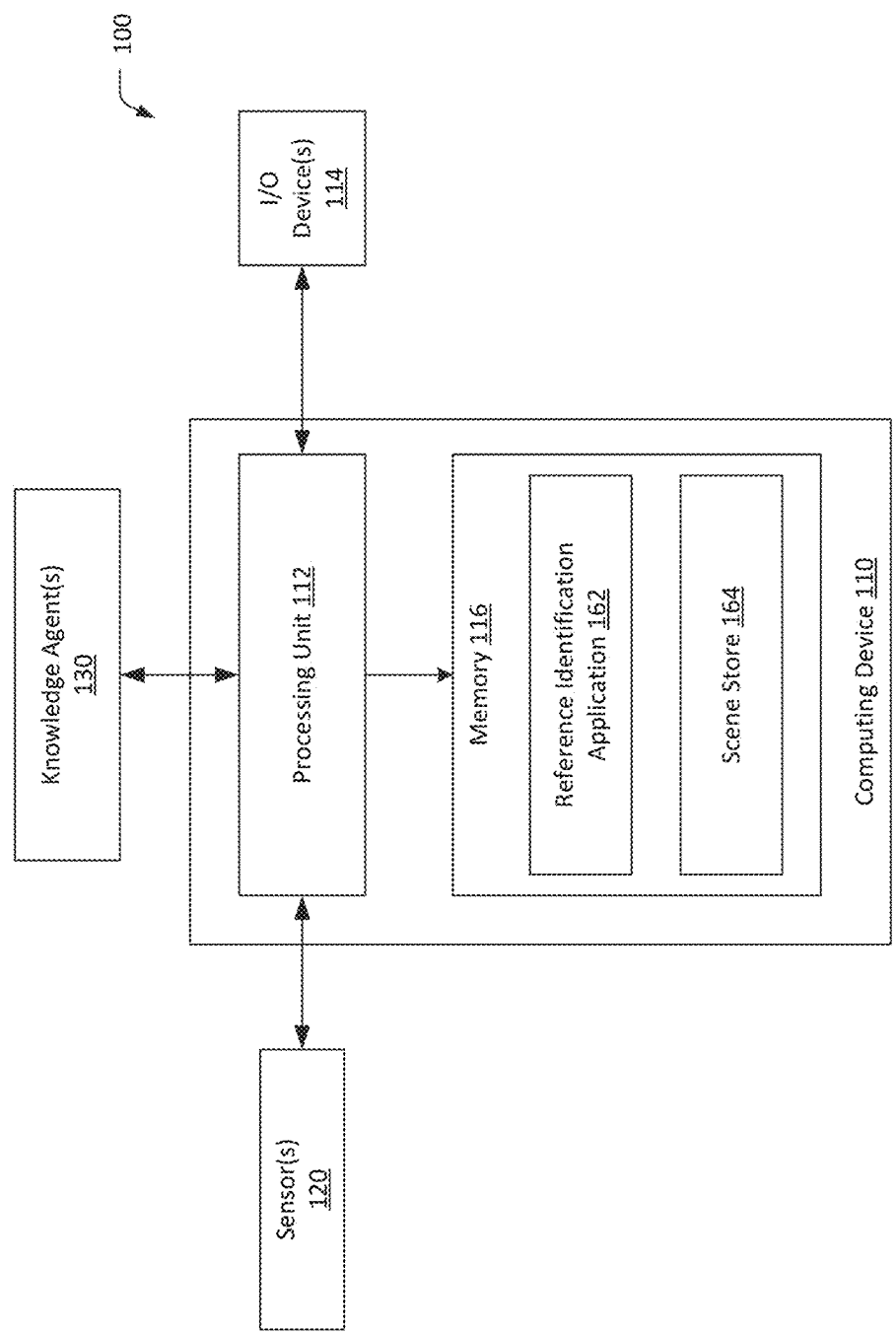
FIG. 1 illustrates a block diagram of a reference identification system configured to implement one or more aspects of the present disclosure.

FIG. 1 illustrates a block diagram of a reference identification system configured to implement one or more aspects of the present disclosure. Reference identification system 100 includes computing device 110, one or more sensors 120, one or more knowledge agents 130, and one or more input/output (I/O) devices 114. Computing device 110 includes processing unit 112 and memory 116. Memory 116 stores reference identification application 162 and scene store 164.

In operation, processing unit 112 receives sensor data from sensor(s) 120. Processing unit 112 executes reference identification application 162 to store a portion of the received sensor data as a scene in scene store 164. Subsequent to storing the scene, processing unit 112 detects a signal, received from a user via an I/O device 114, as a trigger. In response to detecting the trigger, reference identification application 162 analyzes one or more scenes stored in scene store 164 to identify candidate objects present within the one or more scenes. Upon identifying one or more candidate objects within the scenes, reference identification application 162 selects one of the candidate objects as a selected object.

In various embodiments, reference identification application 162 can select, from a plurality of candidate objects, a specific candidate object, where reference identification application 162 determines the selection based on relevance scores associated with each candidate object. In such instances, reference identification application 162 can compute a relevance score for a given candidate object based on one or more relevance factors associated with the candidate object. For example, in some embodiments, reference identification application 162 could compute quantitative values for relevance factors such as position, size, amount of movement, historical data, and/or other factors associated with the probability that the given candidate object is relevant to the user. In some embodiments, reference identification application 162 can select one candidate object from the plurality of candidate objects by comparing relevance scores associated with each candidate object, where reference identification application 162 selects the candidate object associated with the highest relevance score.

Upon selecting a candidate object, reference identification application 162 generates a query associated with the selected object. In various embodiments, reference identification application 162 can transmit the generated query to one or more knowledge agents 130 in order to obtain information associated with the selected object. In response, reference identification application 162 receives responses from the one or more knowledge agents 130 that include information associated with the selected object. Reference identification application 162 then presents, to the user via one or more I/O devices 114, at least a portion of the information received from the one or more knowledge agents 130.

In some embodiments, reference identification application 162 may receive, for a user, feedback associated with a selected object and/or associated with one or more candidate objects. For example, reference identification application 162 would receive feedback from the user that specifies that reference identification application 162 obtain more information about the selected object. In such instances, reference identification application 162 could retrieve supplemental information from the one or more knowledge agents 130 and could present the supplemental information to the user. In another example, reference identification application 162 would receive feedback to select a different candidate object from the plurality of candidate objects. In such instances, reference identification application 162 could select a different candidate object from the remaining plurality of candidate objects as a newly-selected object and could retrieve additional information about the newly-selected candidate object by querying the one or more knowledge agents 130.

Sensor(s) 120 include one or more devices that detect positions of objects in an environment by performing measurements and/or collecting data. In some embodiments, the one or more sensors 120 may be coupled to and/or included within computing device 110. In some embodiments, computing device 110 may receive sensor data via the one or more sensors 120, where the sensor data reflects the position(s) and/or orientation(s) of one or more objects within an environment. The position(s) and/or orientation(s) of the one or more objects may be derived from the absolute position of the one or more sensors 120, and/or may be derived from a position of an object relative to the one or more sensors 120. Processing unit 112 executes reference identification application 162 to store sensor data in scene store 164. In various embodiments, reference identification application 162 can store data associated with sensor data obtained at a specified time in association with a specific scene. For example, reference identification application 162 could store sensor data collected from one or more sensors 120 within a specified time frame as a portion of a data set that comprised a specific scene. In various embodiments, reference identification application 162 can also store additional data in the data set for the specific scene. For example, reference identification application 162 could add metadata associated with the specified time frame as a portion of the data set comprising a specific scene.

In various embodiments, the one or more sensors 120 can include optical sensors, such RGB cameras, time-of-flight sensors, infrared (IR) cameras, depth cameras, and/or a quick response (QR) code tracking system. In some embodiments, the one or sensors 120 can include position sensors, such as an accelerometer and/or an inertial measurement unit (IMU). The IMU can be a device like a three-axis accelerometer, gyroscopic sensor, and/or magnetometer. In addition, in some embodiments, the one or more sensors 120 can include audio sensors, wireless sensors, including radio frequency (RF) sensors (e.g., sonar and radar), ultrasound-based sensors, capacitive sensors, laser-based sensors, and/or wireless communications protocols, including Bluetooth, Bluetooth low energy (BLE), wireless local area network (WiFi), cellular protocols, and/or near-field communications (NFC).

As noted above, computing device 110 can include processing unit 112 and memory 116. Computing device 110 can be a device that includes one or more processing units 112, such as a system-on-a-chip (SoC), or a mobile computing device, such as a tablet computer, mobile phone, media player, and so forth. Generally, computing device 110 can be configured to coordinate the overall operation of reference identification system 100. The embodiments disclosed herein contemplate any technically-feasible system configured to implement the functionality of reference identification system 100 via computing device 110.

Processing unit 112 can include a central processing unit (CPU), a digital signal processing unit (DSP), a microprocessor, an application-specific integrated circuit (ASIC), a neural processing unit (NPU), a graphics processing unit (GPU), a field-programmable gate array (FPGA), and so forth. In some embodiments, processing unit 112 can be configured to execute reference identification application 162 in order to analyze sensor data acquired by one or more sensors 120, acquire information about one or more candidate objects detected within a scene, and present the acquired information to a user.

In various embodiments, processing unit 112 can execute reference identification application 162 to receive and/or analyze one or more signals generated by I/O device(s) 114. Reference identification application 162 then determines whether the received signal(s) include a trigger indicating that reference identification application 162 should obtain more information about an object in a scene. When reference identification application 162 determines that a trigger was detected, reference identification application 162 identifies, within one or more scenes stored in scene store 164, one or more candidate objects. In various embodiments, reference identification application 162 can identify the one or more candidate objects based on the sensor data that is acquired by one or more sensors 120 and which is stored in association with one or more scenes. For one or more of the candidate objects identified in the scenes stored in scene store 164, reference identification application 162 computes relevance scores associated with the candidate objects. In some embodiments, reference identification application 162 can select one of the candidate objects (a "selected object") based on the computed relevance scores. In some embodiments, reference identification application 162 can compute the relevance score for a candidate object using one or more relevance parameters that reflect the probability that a candidate object is relevant to a user.

In various embodiments, once a particular object is selected (e.g., based on the relevance of the object to a user), reference identification application 162 can query one or more knowledge agents 130 about the selected object. In some embodiments, reference identification application 162 can generate one or more queries associated with the selected object, and can transmit the one or more queries to the one or more knowledge agents 130. Processing unit 112 receives responses from the one or more knowledge agents 130, where the one or more knowledge agents 130 generate the responses based on the received query. Reference identification application 162 analyzes the responses received from the one or more knowledge agents. In some embodiments, reference identification application 162 can filter the responses to generate a set of relevant information for the selected object. Processing unit 112 then transmits at least a portion of the set of relevant information to the user via one or more I/O devices 114. In some embodiments, the one or more I/O devices 114 may present the relevant information via one or more user interfaces. For example, an audio I/O device 114 would emit a spoken language audio signal that verbally presents the relevant information. In another example, a visual I/O device 114 would present the relevant information visually as text and/or graphics.

Memory 116 can include a memory module or collection of memory modules. Reference identification application 162 within memory 116 can be executed by processing unit 112 to implement the overall functionality of the computing device 110 and, thus, to coordinate the operation of the reference identification system 100 as a whole.

Scene store 164 can store values and other data retrieved by processing unit 112 to coordinate the operation of reference identification system 100. During operation, processing unit 112 can be configured to store values in scene store 164 and/or retrieve values stored in scene store 164. For example, scene store 164 could store sensor data, metadata, previously-stored scenes from external sources, digital signal processing algorithms, transducer parameter data, and so forth. Scene store 164 includes data for a certain length of time in the past, prior to a time at which a user queries reference identification system 100 (e.g., immediately prior to a user query). In various embodiments, scene store 164 can include a buffer that stores a constant, predefined number of scenes. In such instances, when the user requests information associated with the environment, reference identification application 162 can retrieve one or more scenes included in the buffer.

I/O devices 114 includes at least one device capable of both receiving input, such as a keyboard, a mouse, a touch-sensitive screen, a microphone and so forth, as well as devices capable of providing output, such as a display screen, loudspeakers, and the like. One or more of I/O devices 114 can be incorporated in computing device 110, or may be external to computing device 110.

Knowledge agent(s) 130 includes at least one application and/or databases that generate a response to a received query. Based on the content of the query, the generated response includes additional information for a given object.

In operation, one or more knowledge agents 130 receive a query from computing device 110 and generate a response to the query. In various embodiments, the response generated by knowledge agent 130 may include additional information associated with a selected object, where the additional information is retrieved based on content included in the received query. For example, a simple query associated with a bird would cause knowledge agent 130 to generate a response that included general information about a bird. A more detailed query associated with a woodpecker would cause knowledge agent 130 to include more detailed information associated with woodpeckers, including, among other things, classification data and/or location data. In various embodiments, one or more knowledge agents may retrieve additional information from one or more internal data sources included in computing device 110 and/or external data sources. When retrieving information from external data sources, the one or more knowledge agents 130 may generate additional queries in order to obtain information from the external data source.

Figure 2:
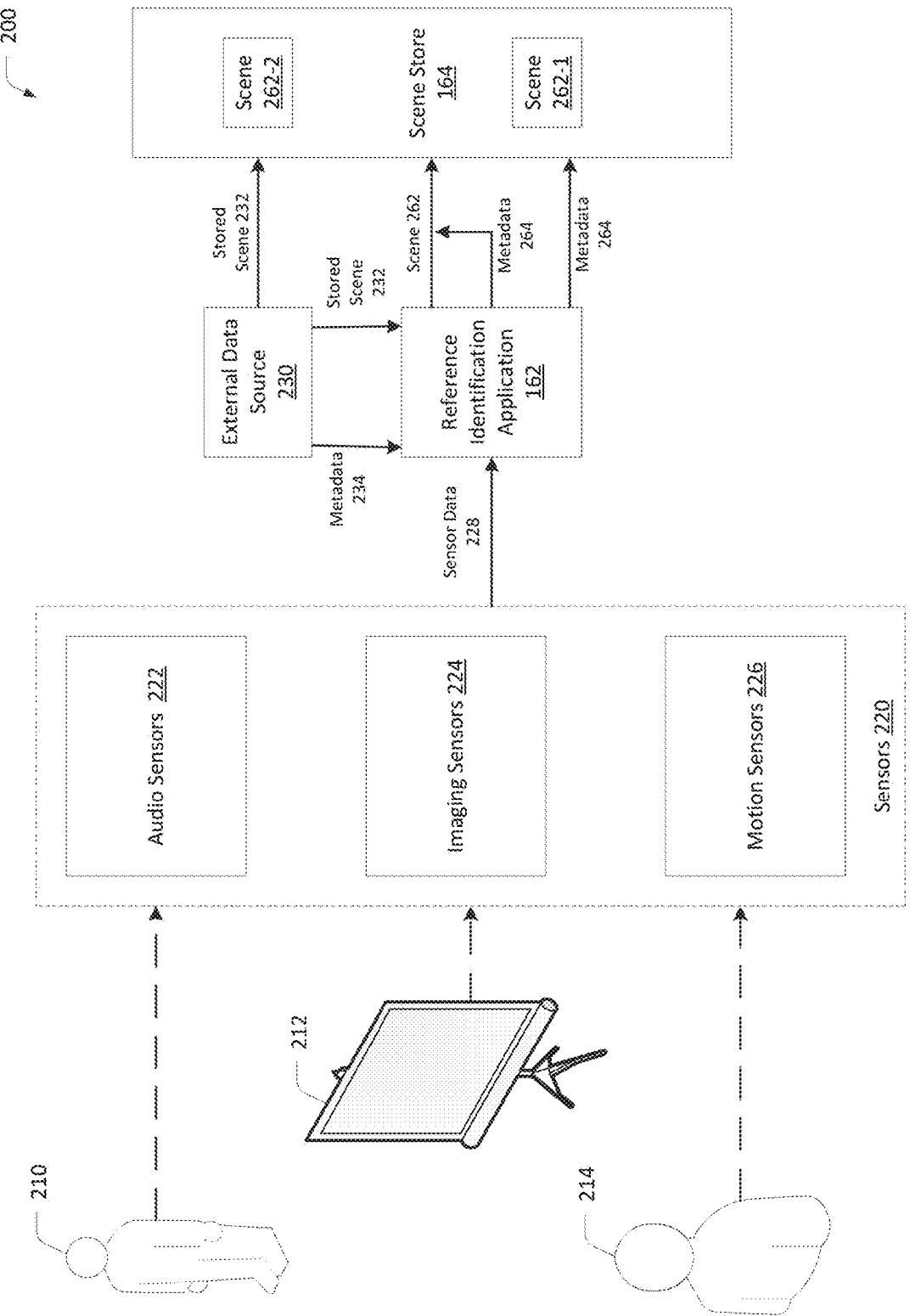
FIG. 2 illustrates a technique for storing sensor data associated with one or more scenes using the reference identification system of FIG. 1, according to various embodiments of the present disclosure.

FIG. 2 illustrates a technique for storing sensor data associated with one or more scenes using the reference identification system of FIG. 1, according to various embodiments of the present disclosure. As shown, reference identification system 200 includes candidate objects 210, 212, 214, sensors 220, reference identification application 162, scene store 164, and external data source 230. Sensors 220 include audio sensors 222, imaging sensors 224, and/or motion sensors 226.

During operation, sensor(s) 220 transmit sensor data 228 to reference identification application 162. In various embodiments, sensor data 228 may include data relating to the position(s) and/or orientation(s) of candidate objects 210, 212, 214 within the environment during a specified time period. For example, during a first specified time period of $t_0$-$t_1$, candidate objects 210, 212, 214 had initial positions; one or more candidate objects 210, 214 changed positions during the first specified period. In this example, one or more sensors 220 could acquire sensor data 228 for the first specified period. Motion sensors 226 acquired motion data, audio sensors 222 acquired audio data, and/or imaging sensors 224 acquired imaging data, respectively. Accordingly, the sensor data 228 that sensors 220 transmitted to reference identification application 162 included position and/or orientation data associated with candidate objects 210, 212, 214 within the first specified time period $t_0$-$t_1$.

Reference identification application 162 receives sensor data 228 from sensors 220 and generates a scene 262 that includes the sensor data 228. Reference identification application 162 sends scene 262 to scene store 164, where the scene is stored as scene 262-1. In various embodiments, reference identification application 162 may receive sensor data 228 associated with a specified time period. Reference identification application 162 can store the sensor data 228 as a portion of a data set associated with scene 262, where scene 262 corresponds to the specified time period. For example, reference identification application 162 would initially receive a first set of sensor data for the first specified time period $t_0$-$t_1$. Reference identification application 162 could then generate a first scene $s_1$ that includes that first set of sensor data.

In various embodiments, reference identification application 162 can include metadata 234, 264, which is associated with the specified time period, into scene 262. In some embodiments, the computing device 110 can generate the metadata 264, or may retrieve the metadata 234 from external data source 230. For example, reference identification application 162 could acquire metadata 234, 264 (e.g., GPS data, data from other applications, data from external data sources, etc.) for the first specified time period. Reference identification application 162 could then include, within the first scene $s_1$, the acquired metadata and the received sensor data 228 for the first specified time period. Examples of metadata 234, 264 that could be associated with scene 262 include scene time-stamps, keywords, location data, lighting data, textual descriptions, and/or instructions or parameters for image and/or audio processing.

In various embodiments, reference identification application 162 could cause a stored scene 232 from an external data source 230 to be stored in scene store 164. For example, reference identification application 162 could cause a portion of content (e.g., a film, television program, song, etc.) to be associated with a first specified time period. In some embodiments, reference identification application 162 can receive the portion of content as stored scene 232; in such instances, reference identification application 162 can generate scene 262 to include stored scene 232 as an included data set. In some embodiments, reference identification application 162 can cause stored scene 232 to be stored directly in scene store 164 as scene 262-2. In such instances, reference identification application 162 can add metadata 264 for the specified time period to scene 262-2.

In various embodiments, external data source 230 can be a database, a storage unit, and/or a computing device. External data source 230 stores data that can be analyzed by reference identification application 162 when reference identification application 162 is analyzing a scene. In some embodiments, reference identification application 162 can generate a query to retrieve data, such as stored scenes 232, metadata 234, and/or other data, from external data source 230. For example, external data source 230 could be an external security system that records multiple frames of video. Reference identification application 162 could query external data source 230 in order to retrieve one or more frames of video stored in external data source 230. Upon retrieving the one or more frames, reference identification application 162 could associate the one or more retrieved frames with one or more scenes 261-1, 261-2 stored in scene store 164.

Figure 3:
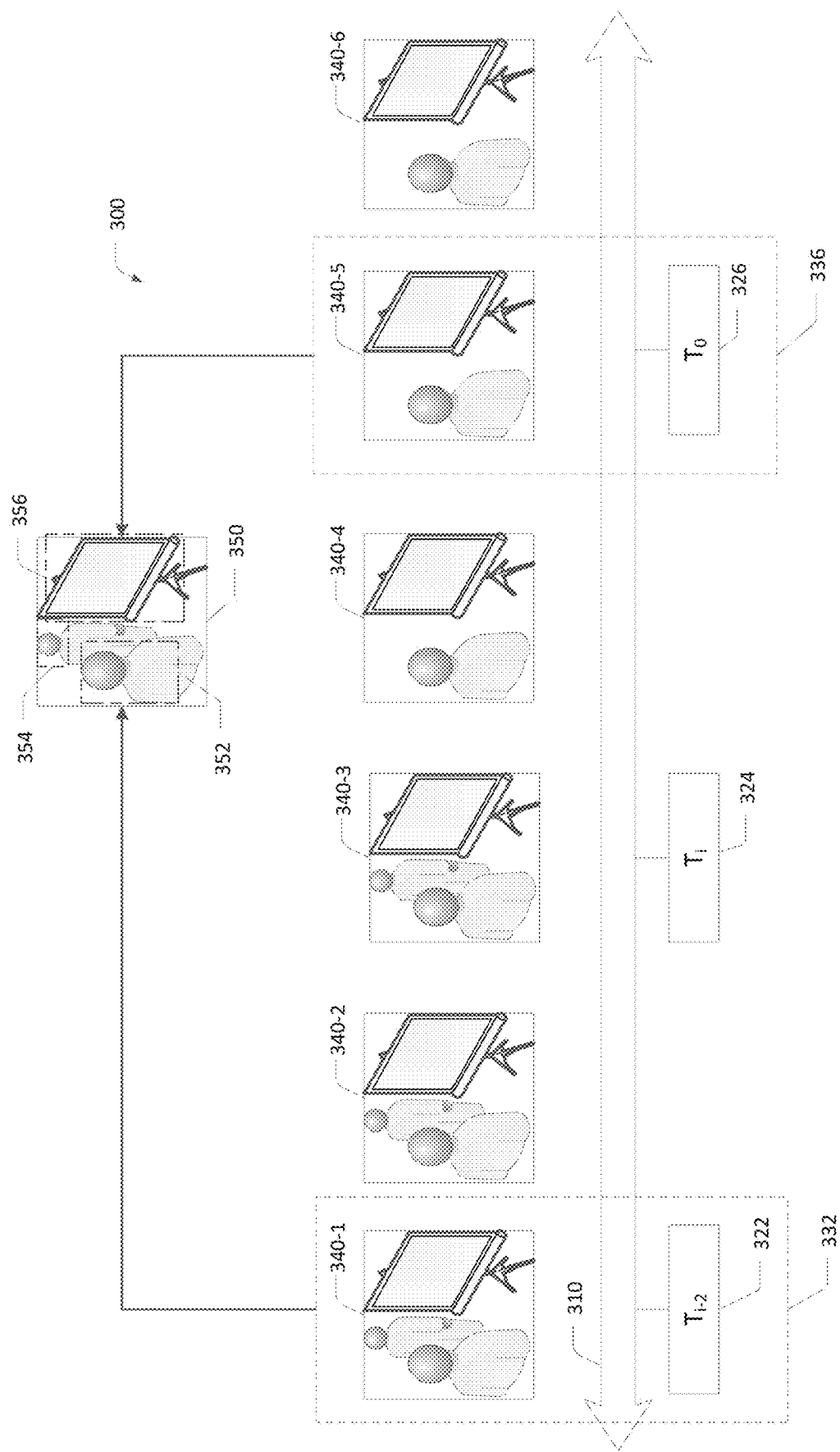
FIG. 3 illustrates a technique for analyzing one or more scenes to identify candidate objects within the scenes using the reference identification system of FIG. 1, according to various embodiment of the present disclosure.

FIG. 3 illustrates a technique for analyzing one or more scenes to identify candidate objects within the scenes using the reference identification system of FIG. 1, according to various embodiments of the present disclosure. As shown, a portion of reference identification application 300 includes a scene timeline 310 and multiple scenes 340 (e.g., 340-1 to 340-6). Each of the scenes 340-1 to 340-6 is associated with a scene time-stamp (e.g., time-stamps 322, 324, 326). Reference identification application 162 analyzes one or more of scenes 340 in order to identify candidate objects 352, 354, 356.

In operation, reference identification application 162 receives a user request and responds by selecting for analysis one or more scenes 340 that are stored in scene store 164. In various embodiments, the user request may be a trigger event detected by reference identification application 162. In some embodiments, the trigger event may be a verbal input. One example of a trigger event would have been when a user made an utterance that included a keyword or key phrase recognized by reference identification application 162, such as "What was that?" In some embodiments, reference identification application 162 can recognize other verbal utterances or sounds generated by the user as trigger events.

In some embodiments, the trigger event may be a different physical input, such as a physical input to a touch-based mechanism. Examples of a physical input to a touch-based mechanism include a button being depressed, a switch being actuated, or a gesture being made upon a touch-sensitive screen (e.g., a tap, a swipe, a double-tap, etc.). Other physical inputs include a user gesture, such as a facial gesture (e.g., a raised eyebrow, a frowned forehead, a wink, a blink, a sudden change in expression, etc.), a hand gesture (e.g., a pointing hand, etc.), a head gesture (e.g., a nod or shake), and/or a body gesture (e.g., placing a hand in front of a mouth, etc.). In some embodiments, the trigger event may be a detected physiological change, or a detected physiological event associated with or experienced by the user, such as a sudden change in respiration rate, heart rate, pupil dilation, and/or brain activity.

In response to detecting the user request, reference identification application 162 selects one or more of scenes 340 in order to analyze data associated with the selections. In various embodiments, each of scenes 340 may be stored in scene store 164. In some embodiments, reference identification application 162 can select one or more scenes 340 by generating a query and retrieving scenes 340 from external data source 230.

In various embodiments, reference identification application 162 can determine the time at which the user request was initiated by the trigger event and can respond by retrieving data associated with the determined time. For example, reference identification application 162 could determine that a trigger event initiated a user request at time $T_0$. Based on determining the time the user request was initiated, reference identification application 162 would make selections associated with time $T_0$. Reference identification application 162 could make selection 336, retrieving data associated with time $T_0$, including scene 340-5. In some embodiments, scene 340-5 and/or other data (including sensor data 228 and or metadata 264) is associated with matching time-stamp 326.

In various embodiments, reference identification application 162 can also make selections that have a predefined relationship with the determined time. In some embodiments, reference identification application 162 could select data that is at predefined time duration before the determined time $T_0$. For example, reference identification application 162 could have been configured to select scenes that are associated with a time-stamp $T_{i-2}$ 322, which is a predefined time duration before the determined time $T_0$. In such an example, reference identification application 162 would make selection 332 and retrieve scene 340-1 and/or other data associated with time-stamp 322.

In various embodiments, reference identification application 162 can execute other methods to select, based on the user request, one or more scenes 340. For example, the user request would indicate a specific time for reference identification application 162 to analyze (e.g., "Who was that in front of me at 5 pm?"). In such instances, reference identification application 162 could set the specified time as the determined time $T_0$ and could select one or more time-stamps 322, 324, 326 based on one or more relations to the specified time.

In various embodiments, reference identification application 162 could retain a buffer (e.g., a buffer in scene store 164) for a constant, predefined number of scenes 340. In such instances, when the user requests information about an object in the environment, reference identification application 162 can retrieve and analyze one or more scenes 340 included in the buffer. In some embodiments, reference identification application 162 can respond to a user request by making two selections of scenes in the buffer: a first selection 336 associated with the time of the trigger event, and a second selection 332 that is associated with a predefined period of time before the first selection 336. In some embodiments, the period of time between the second selection 332 and the first selection 336 may be a constant, specified value. The value for the period between selections may be manually set by the user. In some embodiments, the period between selections may be included in the user request, such as when the request specifies a specific time to analyze (e.g., "what was that object 30 seconds ago?").

For a given scene 340, 350 reference identification application 162 analyzes data associated with the scene 340, 350 to identify one or more candidate objects within the scene 350. For example, reference identification application 162 could select scene 340-1, 340-5 to generate a composite scene 350. Reference identification application 162 could then analyze sensor data 232, metadata 264, and other data associated with composite scene 350 in order to segment portions of composite scene 350 and identify candidate objects 352, 354, 356 included in composite scene 350.

In various embodiments, reference identification application 162 can execute various audio processing, video processing, imaging processing, and/or other processing techniques on sensor data 232 associated with composite scene 350 in order to identify one or more candidate objects 352, 354, 356 within composite scene 350. Similarly, in some embodiments, reference identification application 162 can execute various processing techniques on metadata 264 associated with composite scene 350. For example, reference identification application 162 could retrieve metadata 264 associated with the $T_{i-2}$ time-stamp 322 and metadata 264 associated with $T_0$ time-stamp 326; reference identification application 162 could then analyze metadata 264 in order to identify candidate objects 352, 354, 356 within composite scene 350.

In various embodiments, reference identification application 162 can implement statistical, machine learning (ML), and/or artificial intelligence (AI) techniques to analyze data associated with composite scene 350 in order to identify candidate objects 352, 354, 356 within composite scene 350. In various embodiments, reference identification application 162 can implement at least one ML technique to identify one or more candidate objects 352, 354, 356 based on sensor data 228, metadata 264, and/or other data associated with composite scene 350. Suitable ML and/or AI systems employed in reference identification application 162 can include, for example, a nearest-neighbor classifier procedure, Markov chains, deep learning methods, and/or any other technically-feasible approach.

In various embodiments, reference identification application 162 can analyze a plurality of scenes 340 in order to identify one or more candidate objects 352, 354, 356 that were present in at least one of the scenes. For example, reference identification application 162 could make selections 332, 336 for analysis, where selections 332, 336 include scenes 340-1, 340-5. Reference identification application 162 could separately analyze each selection 332, 336 in order to identify one or more candidate objects 352, 354, 356.

In some embodiments, reference identification application 162 can compare data in the selections 332, 336 in order to identify candidate objects 352, 354, 356 and/or compute relevance scores for each of the identified candidate objects 352, 354, 356. For example, reference identification application 162 could analyze data associated with each of selections 332, 336 by identifying differences between scenes 340-1 and scene 340-5. For example, when comparing selections 332, 336, reference identification application 162 can determine that candidate object 354 is not present in the more-recent scene 340-5, but was previously present in the older scene 340-1. In some embodiments, reference identification application 162 can compute a relevance score associated with candidate object 354 based on the determination that candidate object 354 is no longer present in the more recent scene 340-5. For example, reference identification application 162 can compute a relevance score that includes a relevance factor (e.g., a "missing object" relevance factor) for candidate object 354 that reflects a higher likelihood that the user is requesting information for candidate object 354.

Figure 4:
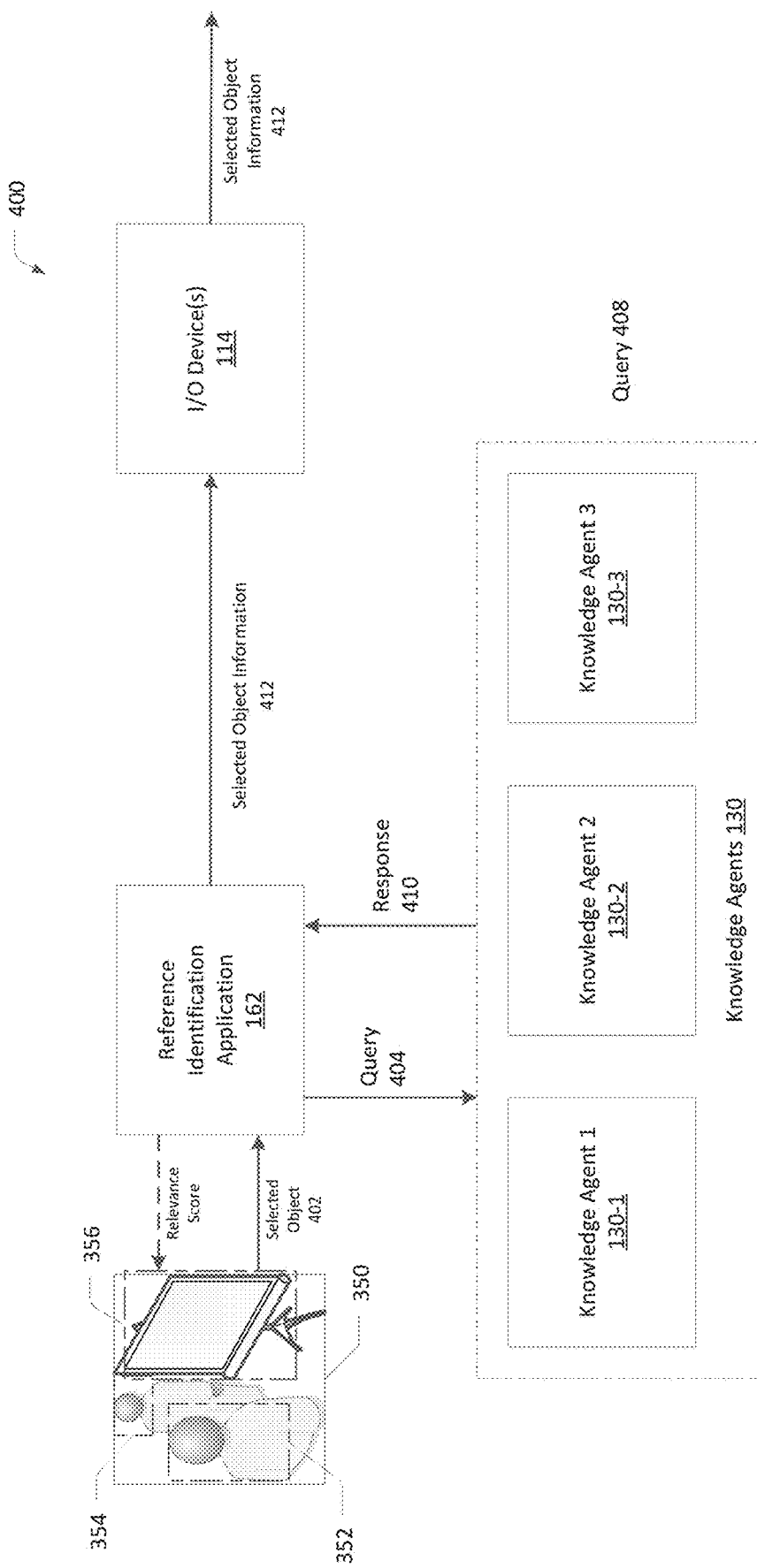
FIG. 4 illustrates a technique for obtaining and providing information associated with a selected object within a scene using the reference identification system of FIG. 1, according to various embodiments of the present disclosure.

FIG. 4 illustrates a technique for obtaining and providing information associated with a selected object within a scene using the reference identification system of FIG. 1, according to various embodiments of the present disclosure. As shown, reference identification system 400 includes reference identification application 162, knowledge agents 130-1 to 130-3, and I/O device(s) 114.

In operation, reference identification application 162 selects one of the candidate objects 352, 354, 356 (referred to herein as a selected object 402) and generates one or more queries 404 based on the selected object 402. Reference identification application 162 selects one or more knowledge agents 130 (e.g., 130-1 to 130-3) to query and sends the one or more queries 404, to the selected knowledge agents 130. Reference identification application 162 receives one or more responses 410 from the selected knowledge agents 130, where the one or more responses 410 include additional information about selected object 402. Reference identification application 162 analyzes the responses 410 and produces a set of information about the selected object 402 (referred to herein as selected object information 412). Reference identification application 162 provides the selected object information 412 via I/O device(s) 114.

In various embodiments, reference identification application 162 can select one candidate object 354, from the one or more candidate objects 352, 354, 356 included in scene 350, based on a computed relevance score. Reference identification application 162 can compute relevance scores for each candidate object 352, 354, 356 included in composite scene 350. When computing a relevance score (R) for a candidate object 352, reference identification application 162 calculates one or more relevance factors (rf) associated with candidate object 352, where one or more calculated relevance factors are used to compute the relevance score $(R_1 = f\{rf_1, rf_2, \ldots rf_n\})$. Reference identification application 162 analyzes the properties of candidate objects 352, 354, 356 and computes a relevance factor associated with one or more of the properties that were analyzed. Reference identification application 162 computes relevance scores for each of the candidate objects 352, 354, 356 using one or more relevance factors. In some embodiments, reference identification application 162 can rank candidate objects 352, 354, 356 based on the respective relevance scores. In some embodiments, reference identification application 162 can select candidate object 354 based on the relative rankings of each candidate object 352, 354, 356.

In some embodiments, properties of a candidate object 352 may include objective properties, such as the color, shape, classification, location, etc., of the candidate object 352. In some embodiments, properties of a candidate object 352 may include relative properties, such as which candidate object 352, 354, 356 is the loudest, largest, brightest, fastest, smelliest, hardest, most dangerous, most repetitive, most mentioned in social-media feeds, etc. In some embodiments, reference identification application 162 may assign quantitative values to one or more properties of a candidate object 352, when computing a relevance factor.

For example, reference identification application 162 would segment a composite scene 350. Composite scene 350 includes three candidate objects: a first candidate object 352, a second candidate object 354, and a third candidate object 356. Reference identification application 162 could analyze properties of the three candidate objects separately and assign values to each of the determined properties. In this example, reference identification application 162 would be configured to assign relevance factor values to each of the determined properties (e.g., brightest object=0.8, largest object=0.4, moving objects=0.2, etc.). Reference identification application 162 could determine that first candidate object 352 is the largest object, the dimmest object, and the fastest object. Similarly, reference identification application 162 could determine that second object 354 is the brightest object and is the slowest object (e.g., is stationary). Finally, reference identification application 162 could determine that the third candidate object 356 is the brightest object and is the most repetitive object. Reference identification application 162 could compute separate relevance factors based on each of the determined properties and compute a relevance score by applying a weight value to each of the computed relevance factors and adding the weighted relevance factors. For example, reference identification application 162 could respectively compute relevance scores of 0.6 for first candidate object 352, 0.8 for second candidate object 354, and a 0.3 for third candidate object 356. Based on the computed relevance scores, reference identification application 162 could choose second candidate object 354 as selected object 402.

In addition to relevance factors based on the properties of candidate objects 352, 354, 356, in some embodiments, reference identification application 162 computes other relevance factors associated with candidate objects 352, 354, 356. For example, other relevance factors include previous the number of queries generated for the object, whether the object is absent in the most-recent scene 340-5, whether the object was previously tagged with keywords, biometric data related to the user (e.g., heart rate, brain activity, skin conductance, blood oxygenation, etc.), qualitative factors, and so forth. For example, reference identification application 162 can be configured to associate specific ranges of heart rate to specific relevance factors (e.g., reference identification application 162 will apply a higher weight value to the loudest object relevance factor when the heart rate of the user is between 150 and 180 beats per minute). In some embodiments, reference identification application 162 may assign quantitative values for a qualitative factor when computing the relevance factor.

In another example, reference identification application 162 would identify four candidate objects from a selection 332. Selection 332 includes stored scene 232 and metadata 234 retrieved from external data source 230, as well as sensor data 228. Stored scene 232 includes the four candidate objects including actor 1, actor 2, actor 3, and background object 1. Reference identification application 162 could analyze metadata 234 associated with stored scene 232 and determine that for stored scene 232, actor 1 has the highest number of previous queries made. Similarly, reference identification application 162 can determine that actor 2 was the candidate object most-mentioned in social media feeds. Similarly, reference identification application 162 can determine that actor 3 is present in stored scene 232, but is not present in a previous scene. Finally, reference identification application 162 can determine that background object 1 is the largest object and the brightest object. In this example, reference identification application 162 would be configured to assign values to each of the relevance factors. Reference identification application 162 could also be configured to analyze biometric data associated with the user to determine which how relevance factors are to be weighted. Reference identification application 162 could compute the separate relevance factors and then compute a relevance score based on each of the relevance factors. In this example, reference identification application 162 could compute a relevance score of 0.9 for actor 1, 0.7 for actor 2, and 0.3 for actor 3, and 0.2 for background object 1, respectively. Based on the computed relevance scores, reference identification application 162 could choose actor 1 as selected object 402 and generate query 404 to obtain additional information about actor 1.

In another example, reference identification application 162 could generate a composite scene 350 based on multiple selections 332, 336. When analyzing composite scene 350, reference identification application 162 could separately analyze scenes 340-1 and 340-5. In such instances, reference identification application 162 would determine that candidate object 354 was present in scene 340-1, but not present in scene 340-5 and apply a fleeting object relevance factor to candidate object 354. In this example, reference identification application 162 could be configured to assign a high value to the fleeting object relevance factor (e.g., fleeting object relevance factor=0.95). Accordingly, reference identification application 162 could computes a high relevance score for candidate object 354 based on the fleeting object relevance factor.

Upon selecting candidate object 354 as selected object 402, reference identification application 162 generates one or more queries 404 based on selected object 402. Reference identification application 162 generates query 404 associated with the selected object 402, where response 410 subsequently received by reference identification application 162 provides information associated with selected object 402.

In various embodiments, reference identification application 162 selects one or more knowledge agents 130 (e.g., 130-1 to 130-3) that are to receive the generated query 404. In some embodiments, reference identification application 162 selects knowledge agent 1 130-1 based on the content of the query. For example, reference identification application 162 would analyze the content of query 404 to determine whether knowledge agent 1 130-1 is able to respond with applicable information. When reference identification application 162 determines that knowledge agent 1 130-1 is able to provide applicable information to query 404, reference identification application 162 sends query 404 to knowledge agent 1 130-1. In some embodiments, reference identification application 162 can also select additional knowledge agents 130, such as knowledge agent 2 130-2 and/or knowledge agent 3 130-3, and send query 404 to each of knowledge agents 130-2, 130-3. One or more knowledge agents 130 receive the query 404 and responds to the content included in query 404 by retrieving additional information associated with the included content. In some embodiments, knowledge agent 130 may be a database that stores information. In such instances, query 404 may cause a set of data to be extracted from the database. In some embodiments, knowledge agent 130 may be an application programming interface (API) that can generate additional queries to retrieve information from external data sources. Upon acquiring the additional information associated with the content included in query 404, knowledge agent 130 generates and sends response 410 to reference identification application 162, where the response includes the retrieved information that associated with selected object 402.

In various embodiments, the reference identification application 162 can determine whether the user wants additional information on selected object 402. In such instances, reference identification application 162 can respond to the user requesting additional information by sending one or more additional queries 404 associated with selected object 402. In some embodiments, reference identification application 162 can generate successive queries 404 based on one or more responses 410 received from knowledge agents 130. For example, reference identification application 162 would generate and send a first query 404 to knowledge agent 1 130-1. Reference identification application 162 would receive a first response whose content includes a definition for the selected object 402 (e.g., "the object is a person."). Upon receiving the first response, reference identification application 162 could then generate a second query 404 that causes knowledge agent 2 130-2 to provide more-detailed information about selected object 402 (e.g., "the person is Ann."). Similarly, upon receiving the second response 410, reference identification application 162 may generate a third query 404 that causes knowledge agent 3 130-3 to provide additional information about selected object 402 (e.g., "Ann lives in San Jose, Calif."). In some embodiments, reference identification application 162 can generates the additional queries 404 before receiving feedback from the user.

Reference identification application 162 analyzes the information included in response 410 in order to generate a set of information about selected object 402. Reference identification application 162 transmits a portion of the set of information as selected object information 412 to the user via I/O device(s) 114. In various embodiments, I/O device(s) 114 can provide selected object information 412 to the user via any suitable presentation mode. For example, a user-selected setting of reference identification system 100 would indicate that the preferred presentation mode for selected object information 412 is auditory. In another example, a user-selected setting of reference identification system 100 would indicate that the preferred presentation mode for selected object information 412 is visual, including displaying text and/or images on a display included in a mobile device. Further, selected object information 412 may be segmented into separate portions and provided via multiple I/O devices 114. For example, reference identification application 162 could cause loudspeakers to deliver a first portion of selected object information 412, and reference identification application 162 could cause a display to deliver a second portion of selected object information 412.

In various embodiments, reference identification application 162 can determine whether the user wants to select a different candidate object 352, 356 included in composite scene 350. In such instances, reference identification application 162 can choose a different selected object 402 by selecting one candidate object 352 that is in the remaining in the group of candidate objects 352, 356. Upon choosing the different selected object 402, reference identification application 162 may generate a query 404 and send the query to an applicable knowledge agent 130 in order to obtain additional information related to the different selected object 402.

Figure 5:
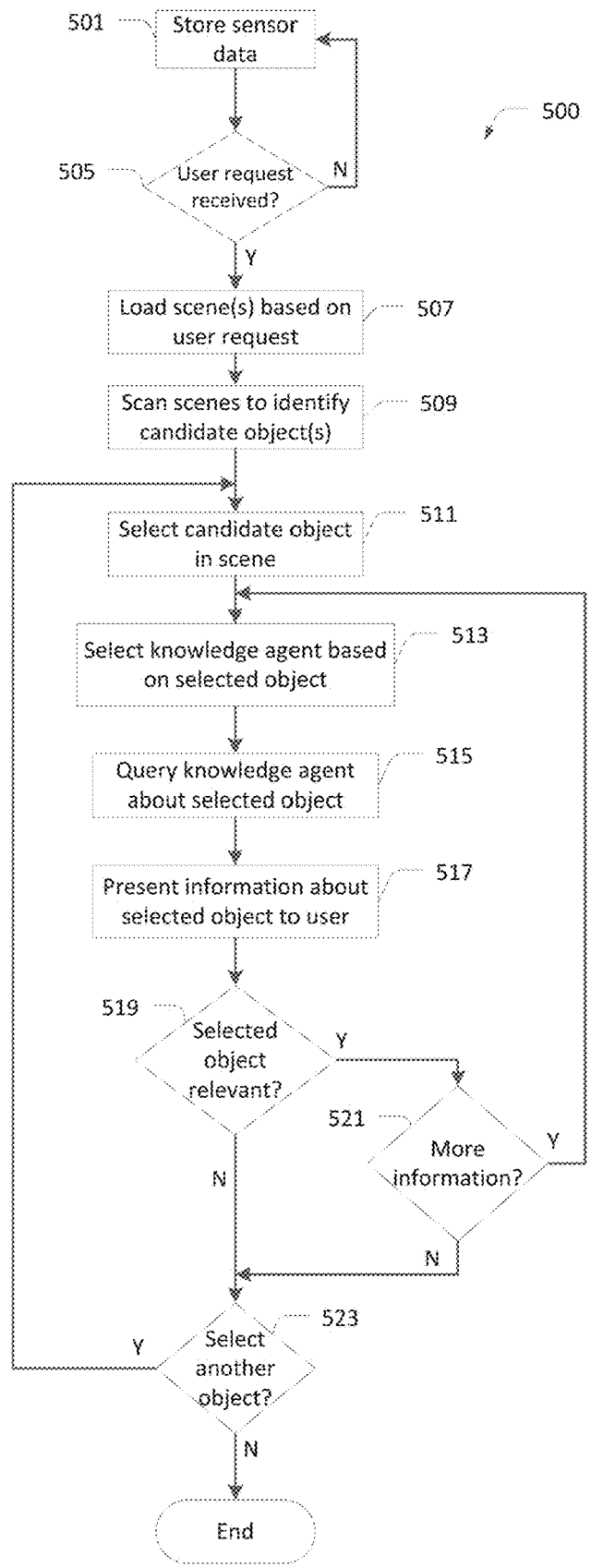
FIG. 5 is a flow diagram of method steps for providing information associated with an object included in a scene, according to various embodiments of the present disclosure.

FIG. 5 is a flow diagram of method steps for providing information associated with an object included in a scene, according to various embodiments of the present disclosure. Although the method steps are described with respect to the systems of FIGS. 1-4, persons skilled in the art will understand that any system configured to perform the method steps, in any order, falls within the scope of the various embodiments.

As shown, a method 500 begins at step 501, where reference identification application 162 stores sensor data received from sensors 220. In various embodiments, reference identification application 162 can receive sensor data 228 from sensors 220. Reference identification application 162 generates a scene 262 that is associated with sensor data 228 associates the scene with a time-stamp 322. Reference identification application 162 stores scene 262 in scene store 164. In various embodiments, reference identification application 162 may also associate metadata 264 with scene 262 and store metadata 264 in scene store 164.

At step 505, reference identification application 162 determines whether a user request was received. In various embodiments, the user request may be a trigger event that can be detected by reference identification application 162. The trigger event may be a verbal input, physical input on a touch-based mechanism, physical gesture, and so forth. When reference identification application 162 detects the trigger event, reference identification application 162 determines that a user request was received and proceeds to step 507; otherwise, reference identification application 162 determines that a user request was not received and returns to step 501.

At step 507, reference identification application 162 loads one or more scenes 340 (e.g., 340-1 to 340-6) based on the user request. In response to detecting the user request, reference identification application 162 loads one or more scenes 340 that stored in scene store 164, and makes one or more selections 332, 336 in order to analyze data that is associated with the selections 332, 336. In some embodiments, reference identification application 162 may load the one or more scenes 340 by generating a query and retrieving the one or more stored scenes 232 from external data source 230.

In various embodiments, reference identification application 162 can retain a buffer in scene store 164 for a constant, predefined number of scenes 340. In such instances, when the user requests information about an object in the environment, reference identification application 162 can retrieve the one or more scenes 340 included in the buffer. In some embodiments, reference identification application 162 can respond to a user request by making two selections of scenes in the buffer: a first selection 336 associated with the time of the trigger event, and a second selection 332 that is at a predefined time period before first selection 336.

At step 509, reference identification application 162 scans the selected scenes in order to identify one or more candidate objects (e.g., candidate objects 352, 354, 356). For a given selection 332, reference identification application 162 analyzes data associated with the selection 332 and/or scene 340-1, including sensor data 228 and metadata 264 associated with scene 340-1, in order to identify one or more candidate objects 352, 354, 356. For example, reference identification application 162 could analyze sensor data 232, metadata 264, and other data associated with scene 340-1 included in selection 332 in order to segment portions of scene 340-1 and identify candidate objects 352, 354, 356.

At step 511, reference identification application 162 selects one of the candidate objects 352, 354, 356 (a selected object 402) included in the scene 340-1. In various embodiments, reference identification application 162 can compute relevance scores for each candidate object 352, 354, 356 included in scene 340-1 and can select a candidate object 354 based on the computed relevance score. When computing a relevance score, reference identification application 162 calculates one or more relevance factors associated with a candidate object 352, where one or more calculated relevance factors are used to compute the relevance score. In some embodiments, reference identification application 162 can rank candidate objects 352, 354, 356 based on the computed relevance scores and can select one candidate object 354 that is ranked highest.

At step 513, reference identification application 162 selects a knowledge agent 130 based on selected object 402. In various embodiments, reference identification application 162 selects one or more knowledge agents 130 that are to receive a query 404 related to selected object 402. In some embodiments, reference identification application 162 may analyze selected object 402 and/or the content of query 404 in order to determine whether a particular knowledge agent 130 (e.g., knowledge agent 1 130-1) is able to respond with applicable information.

At step 515, in operation, reference identification application 162 generates query 404 based on selected object 402. Reference identification application 162 sends query 404 to knowledge agent 130 and receives response 410. Response 410 includes additional information about selected object 402. When generating response 410, knowledge agent 130 receive query 404, analyzes the content included in query 404, and retrieves additional information based on the content included in query 404. Knowledge agent 130 generates and sends response 410, where response 410 includes the information associated with selected object 402.

At step 517, reference identification application 162 provides selected object information 412 to the user. In various embodiments, reference identification application 162 can analyze the information included in response 410 in order to generate a set of information about selected object 402. In some embodiments, reference identification application 162 can analyze the set of information and generate selected object information 412 as a portion of the set of information. Reference identification application provides selected object information 412 to the user 101 via one or more I/O devices 114.

At step 519, reference identification application 162 determines whether selected object 402 is relevant to the user. In various embodiments, reference identification application 162 may receive a response from a user that indicates whether the selected object 402 was the object that caused the user to initiate the user request. If the reference identification application 162 determines that selected object 402 was relevant to the user and was therefore the object that caused the user to initiate the user request, reference identification application 162 can then proceed to step 521; otherwise, when reference identification application 162 determines that selected object 402 was not relevant to the user, reference identification application 162 can then proceed to step 523.

At step 521, reference identification application 162 determines whether the user wants more information about selected object 402. In various embodiments, reference identification application 162 can determine whether the user wants additional information on selected object 402. For example, reference identification application 162 would receive a user input that indicates that more information is requested. In such instances, reference identification application 162 could respond to the user requesting additional information by returning to step 513, where reference identification application 162 selects a knowledge agent 130 (e.g., knowledge agent 3 130-3), generates an additional query 404, and sends the additional query 404 to the selected knowledge agent 3 130-3.

At step 523, reference identification application 162 determines whether the user wants to select a different candidate object 352, 356 included in the scene 340-1. When reference identification application 162 determines that the user wants to make a different selection, reference identification application 162 can choose a different selected object 402 by returning to step 511, where reference identification application 162 selects one candidate object 352 that is remaining in the group of candidate objects 352, 356 in scene 340-1. Upon choosing the different selected object 402, reference identification application 162 can proceed through steps 513-517 by generating query 404 in order to obtain additional information related to the different selected object 402. When reference identification application 162 determines that the user does not want to make a different selection, reference identification application 162 can end method 500.

In sum, one or more sensors of a reference identification system acquire sensor data that is associated with one or more objects in an environment. A reference identification application included in the reference identification system stores, in a scene store, a scene that is associated with the sensor data and associated metadata. When the reference identification application determines that the user has triggered a request for information associated with an object included in the scene, the reference identification application loads and analyzes the data associated with one or more of the scenes stored in the scene store. The reference identification application selects a candidate object included in the one or more scenes, then queries a knowledge agent for information related to the selected object. The reference identification application then presents the information about the selected object to the user. If the user indicates that the selected object is not the object about which the user intended to obtain more information, the reference identification application then selects a different object within the one or more scenes and obtains information about the different object.

At least one technological advantage of the disclosed techniques is that an object within a given scene can be identified, even when the object is no longer present within the scene. A further advantage is that information for an identified object in a scene can be obtained from one or more data sources and provided to a user without requiring the user to provide detailed information related to the object.

1. In some embodiments, a computer-implemented method for identifying an object within an environment comprises receiving, via at least one sensor, first sensor data associated with an environment, storing, in a memory, the first sensor data in association with a first scene, and in response to receiving a user request for information associated with the environment selecting, based on the user request, the first scene, accessing, via the memory, the first sensor data associated with the first scene, and analyzing the first sensor data to identify a first object included in the first scene, and causing information associated with the first object to be output via at least one output device.

2. The computer-implemented method of clause 1, further comprising storing, in the memory, second sensor data in association with a second scene, and in response to receiving the user request for the information associated with the environment selecting, based on the user request, the second scene, accessing, via the memory, the second sensor data associated with the second scene, and analyzing the second sensor data to identify the first object, where the first object is included in at least one of the first scene and the second scene.

3. The computer-implemented method of clause 1-2, where first scene includes the first object, and second scene does not include the first object.

4. The computer-implemented method of any of clauses 1-3, where the first scene is associated with a first time-stamp, the second scene is associated with a second time-stamp, and the first time-stamp and the second time-stamp are included in a time period specified in the user request.

5. The computer-implemented method of any of clauses 1-4, further comprising analyzing the first sensor data to identify a second object included in the first scene, selecting, from among at least the first object and the second object, the first object, and obtaining information associated with the first object.

6. The computer-implemented method of any of clauses 1-5, where selecting the first object comprises computing a first relevance score associated with the first object, computing a second relevance score associated with the second object, and comparing the first relevance score with the second relevance score, where the first relevance score is greater than the second relevance score.

7. The computer-implemented method of any of clauses 1-6, where computing the first relevance score comprises calculating a first relevance factor for the first object, and calculating a second relevance factor for the first object, where first relevance score is based on at least the first relevance factor and the second relevance factor.

8. The computer-implemented method of any of clauses 1-7, where receiving the user request comprises detecting a trigger event initiated by the user.

9. The computer-implemented method of any of clauses 1-8, further comprising receiving, via at least one external data store, first external data associated with the first scene, and storing, in the memory, the first external data in association with the first scene.

10. In some embodiments, one or more non-transitory computer-readable media including instructions that, when executed by one or more processors, cause the one or more processors to perform the steps of receiving, via at least one sensor, first sensor data associated with an environment storing, in a memory the first sensor data in association with a first scene, and first external data in association with the first scene, where the first external data is received from at least one external data source, and in response to receiving a user request for information associated with the environment selecting, based on the user request, the first scene, accessing, via the memory, at least one of the first sensor data and the first external data, and analyzing at least one of the first sensor data and the first external data to identify a first object included in the first scene, and causing information associated with the first object to be output via at least one output device.

11. The non-transitory computer-readable media of clause 10, further comprising instructions that, when executed by the one or more processors, cause the one or more processors to perform the steps of receiving a user request for additional information associated with the first object, obtaining supplemental information associated with the first object, and causing the supplemental information associated with the first object to be output via at least one output device.

12. The non-transitory computer-readable media of clause 10 or 11, further comprising instructions that, when executed by the one or more processors, cause the one or more processors to perform the step of selecting, based on the first object, a first knowledge agent, where the first knowledge agent provides the information associated with the first object.

13. The non-transitory computer-readable media of any of clauses 10-12, further comprising instructions that, when executed by the one or more processors, cause the one or more processors to perform the step of selecting, based on the first object, a second knowledge agent, where the second knowledge agent is distinct from the first knowledge agent and provides the supplemental information associated with the first object.

14. The non-transitory computer-readable media of any of clauses 10-13, further comprising instructions that, when executed by the one or more processors, cause the one or more processors to perform the step of detecting a trigger event initiated by the user, where the trigger event initiates the user request, and where selecting, based on the user request, the first scene comprises determining a first time-stamp associated with the trigger event, determining that the first scene is associated with the first time-stamp, and selecting the first scene.

15. The non-transitory computer-readable media of any of clauses 10-14, further comprising instructions that, when executed by the one or more processors, cause the one or more processors to perform the steps of, in response to receiving the user request for information associated with the environment accessing, via the memory, first metadata associated with the first scene, and analyzing the first metadata to identify a first object included in the first scene.

16. The non-transitory computer-readable media of any of clauses 10-15, further comprising instructions that, when executed by the one or more processors, cause the one or more processors to perform the steps of storing, in the memory, second sensor data in association with a second scene, and in response to receiving the user request for information associated with the environment selecting, based on the user request, the second scene, accessing, via the memory, the second sensor data, and analyzing the second sensor data to identify the first object, where the first object is included in at least one of the first scene and the second scene.

17. The non-transitory computer-readable media of any of clauses 10-16, further comprising instructions that, when executed by the one or more processors, cause the one or more processors to perform the steps of analyzing the first sensor data to identify a second object included in the first scene, selecting, from among the first object and the second object, the first object, and obtaining information associated with the first object.

18. The non-transitory computer-readable media of claim 17, further comprising instructions that, when executed by the one or more processors, cause the one or more processors to perform the steps of computing a first relevance score associated with the first object, computing a second relevance score associated with the second object, and comparing the first relevance score with the second relevance score, where the first relevance score is greater than the second relevance score.

19. In some embodiments, an object identification system comprises at least one sensor configured to produce first sensor data associated with an environment, a memory configured to store the first sensor data in association with a first scene, and a processor coupled to the at least one sensor and the memory and configured to receive, from the at least one sensor, the first sensor data, store, in the memory, the first sensor data, and in response to receiving a user request for information associated with the environment select, based on the user request, the first scene, analyze at least one of the first sensor data and the first metadata associated with the first scene to identify a first object included in the first scene, and transmit a query associated with the first object to a first knowledge agent, receive, from the first knowledge agent, a first response including information associated with the first object, and cause the information associated with the first object to be output via at least one output device.

20. The object identification system of clause 19, where the processor is further configured to analyzing at least one of the first sensor data and the first metadata to identify a second object included in the first scene, compute a first relevance score associated with the first object, compute a second relevance score associated with the second object, compare the first relevance score with the second relevance score, where the first relevance score is greater than the second relevance score, and selecting, from among the first object and the second object, the first object.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for identifying an object within an environment, the method comprising:
receiving, via at least one sensor, first sensor data associated with the environment;
storing, in a memory, the first sensor data in association with a first scene; and
in response to receiving a user request for information associated with the environment:
selecting, based on the user request, the first scene;
accessing, via the memory, the first sensor data associated with the first scene; and
analyzing the first sensor data to identify a first object included in the first scene;
determining that a first knowledge agent included in a plurality of knowledge agents has information associated with the first object by analyzing the first object;
in response to determining that the first knowledge agent has information associated with the first object, selecting the first knowledge agent from the plurality of knowledge agents and transmitting a query associated with the first object to the first knowledge agent, wherein the first knowledge agent provides the information associated with the first object; and causing the information associated with the first object to be output via at least one output device.

2. The computer-implemented method of claim 1, further comprising:
   storing, in the memory, second sensor data associated with a second scene; and
   in response to receiving the user request for the information associated with the environment:
      selecting, based on the user request, the second scene;
      accessing, via the memory, the second sensor data associated with the second scene; and
      analyzing the second sensor data to identify the first object, wherein the first object is included in at least one of the first scene and the second scene.

3. The computer-implemented method of claim 2, wherein the first scene includes the first object, and the second scene does not include the first object.

4. The computer-implemented method of claim 2, wherein the first scene is associated with a first time-stamp, the second scene is associated with a second time-stamp, and the first time-stamp and the second time-stamp are included in a time period specified in the user request.

5. The computer-implemented method of claim 1, further comprising:
   analyzing the first sensor data to identify a second object included in the first scene.

6. The computer-implemented method of claim 5, further comprising:
   computing a first relevance score associated with the first object based on at least one of a position of the first object within the first scene, a size of the first object within the first scene, or a brightness of the first object within the first scene;
   computing a second relevance score associated with the second object; and
   in response to determining that the first relevance score is greater than the second relevance score, selecting the first object from among the first object and the second object.

7. The computer-implemented method of claim 6, wherein computing the first relevance score comprises:
   calculating a first relevance factor for the first object; and
   calculating a second relevance factor for the first object, wherein the first relevance score is based on at least the first relevance factor and the second relevance factor.

8. The computer-implemented method of claim 1, wherein receiving the user request comprises detecting a trigger event initiated by a user.

9. The computer-implemented method of claim 1, further comprising:
   receiving, via at least one external data store, first external data associated with the first scene; and
   storing, in the memory, the first external data in association with the first scene.

10. One or more non-transitory computer-readable media including instructions that, when executed by one or more processors, cause the one or more processors to perform the steps of:
   receiving, via at least one sensor, first sensor data associated with an environment;
   storing, in a memory:
      the first sensor data in association with a first scene, and
      first external data in association with the first scene, wherein the first external data is received from at least one external data source; and
   in response to receiving a user request for information associated with the environment:
      selecting, based on the user request, the first scene;
      accessing, via the memory, at least one of the first sensor data and the first external data; and
      analyzing at least one of the first sensor data and the first external data to identify a first object included in the first scene;
      determining that a first knowledge agent included in a plurality of knowledge agents has information associated with the first object by analyzing the first object;
      in response to determining that the first knowledge agent has information associated with the first object, selecting the first knowledge agent from the plurality of knowledge agents and transmitting a query associated with the first object to the first knowledge agent, wherein the first knowledge agent provides the information associated with the first object; and
      causing the information associated with the first object to be output via at least one output device.

11. The one or more non-transitory computer-readable media of claim 10, further comprising instructions that, when executed by the one or more processors, cause the one or more processors to perform the steps of:
   receiving a user request for additional information associated with the first object;
   obtaining supplemental information associated with the first object; and
   causing the supplemental information associated with the first object to be output via at least one output device.

12. The one or more non-transitory computer-readable media of claim 11, further comprising instructions that, when executed by the one or more processors, cause the one or more processors to perform the step of selecting, based on the first object, a second knowledge agent, wherein the second knowledge agent is distinct from the first knowledge agent and provides the supplemental information associated with the first object.

13. The one or more non-transitory computer-readable media of claim 10, further comprising instructions that, when executed by the one or more processors, cause the one or more processors to perform the step of detecting a trigger event initiated by a user, wherein the trigger event initiates the user request, and wherein selecting, based on the user request, the first scene comprises:
   determining a first time-stamp associated with the trigger event;
   determining that the first scene is associated with the first time-stamp; and
   selecting the first scene.

14. The one or more non-transitory computer-readable media of claim 10, further comprising instructions that, when executed by the one or more processors, cause the one or more processors to perform the steps of, in response to receiving the user request for information associated with the environment:
   accessing, via the memory, first metadata associated with the first scene; and
   analyzing the first metadata to identify the first object included in the first scene.

15. The one or more non-transitory computer-readable media of claim 10, further comprising instructions that, when executed by the one or more processors, cause the one or more processors to perform the steps of:
   storing, in the memory, second sensor data associated with a second scene; and
   in response to receiving the user request for information associated with the environment:

selecting, based on the user request, the second scene;
accessing, via the memory, the second sensor data; and
analyzing the second sensor data to identify the first object, wherein the first object is included in at least one of the first scene and the second scene.

16. The one or more non-transitory computer-readable media of claim 10, further comprising instructions that, when executed by the one or more processors, cause the one or more processors to perform the steps of:
analyzing the first sensor data to identify a second object included in the first scene.

17. The one or more non-transitory computer-readable media of claim 16, further comprising instructions that, when executed by the one or more processors, cause the one or more processors to perform the steps of:
computing a first relevance score associated with the first object based on at least one of a position of the first object within the first scene, a size of the first object within the first scene, or a brightness of the first object within the first scene;
computing a second relevance score associated with the second object; and
in response to determining that the first relevance score is greater than the second relevance score, selecting the first object from among the first object and the second object.

18. An object identification system comprising:
at least one sensor configured to produce first sensor data associated with an environment;
a memory configured to store the first sensor data in association with a first scene; and
a processor coupled to the at least one sensor and the memory and configured to:
receive, from the at least one sensor, the first sensor data;
store, in the memory, the first sensor data; and
in response to receiving a user request for information associated with the environment:
select, based on the user request, the first scene;
analyze at least one of the first sensor data and a first metadata associated with the first scene to identify a first object included in the first scene;
determine that a first knowledge agent included in a plurality of knowledge agents has information associated with the first object by analyzing the first object; and
upon determining that the first knowledge agent has information associated with the first object, select the first knowledge agent from the plurality of knowledge agents and transmit a query associated with the first object to the first knowledge agent;
receive, from the first knowledge agent, a first response including information associated with the first object; and
cause the information associated with the first object to be output via at least one output device.

19. The object identification system of claim 18, wherein the processor is further configured to:
analyzing at least one of the first sensor data and the first metadata to identify a second object included in the first scene;
compute a first relevance score associated with the first object;
compute a second relevance score associated with the second object;
compare the first relevance score with the second relevance score, wherein the first relevance score is greater than the second relevance score; and
selecting, from among the first object and the second object, the first object.

* * * * *